United States Patent [19]

Gallagher et al.

[11] Patent Number: 5,328,651
[45] Date of Patent: Jul. 12, 1994

[54] METHOD FOR MANUFACTURING AN AUTOMOBILE TRIM COMPONENT BY BLOW MOLDING AND INJECTION MOLDING

[75] Inventors: Michael J. Gallagher, Hampton; Douglas Nobbs, Dover, both of N.H.

[73] Assignee: Davidson Textron Inc., Dover, N.H.

[21] Appl. No.: 26,773

[22] Filed: Mar. 5, 1993

[51] Int. Cl.⁵ .................. B29C 67/22; B29C 49/04
[52] U.S. Cl. .................. 264/46.1; 264/45.9;
264/46.4; 264/46.5; 264/46.6; 264/151;
264/259; 264/515; 264/513
[58] Field of Search ........ 264/46.4, 45.9, 46.5,
264/46.6, 259, 514, 515, 513, 151, 161, 46.1

[56] References Cited

U.S. PATENT DOCUMENTS

| | | | |
|---|---|---|---|
| 2,948,651 | 8/1960 | Waag | 154/110 |
| 3,088,539 | 5/1963 | Mathues et al. | 180/90 |
| 3,257,482 | 6/1966 | Schechter | 264/45.9 |
| 4,873,045 | 10/1989 | Fujita et al. | 264/259 |
| 4,874,649 | 10/1089 | Daubenbüchel | 428/36.5 |
| 4,923,653 | 5/1990 | Matsuura et al. | 264/46.6 |
| 5,102,588 | 4/1992 | Feuerherm | 264/40.5 |

FOREIGN PATENT DOCUMENTS

| | | | |
|---|---|---|---|
| 55-049249 | 4/1980 | Japan | 264/515 |
| 58-022141 | 2/1983 | Japan | 264/515 |
| 61-089025 | 5/1986 | Japan | 264/516 |
| 62-027978 | 6/1987 | Japan | 264/515 |
| 62-013895 | 7/1987 | Japan | 264/45.9 |
| 1456198 | 11/1976 | United Kingdom | 264/515 |

Primary Examiner—Allan R. Kuhns
Attorney, Agent, or Firm—Reising, Ethington, Barnard, Perry & Milton

[57] ABSTRACT

A method for manufacturing an automobile trim component includes the step of coextruding a plastic unfoamed material and foamed material into a multilayer parison, which is thereafter blow molded to a desired form. After the layers are cured, the article is removed from the blow mold and sectioned into multilayer skin halves, and one skin is placed in an injection mold. The core resin, either thermoplastic or thermoset in nature, is then injected into the injection mold and onto the skin, and then compresses the resin against the skin to produce a shell comprising a resin core layer, intermediate foam layer, and decorative outer layer.

7 Claims, 1 Drawing Sheet

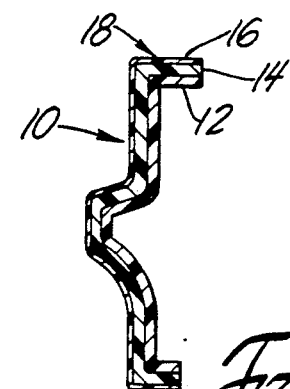
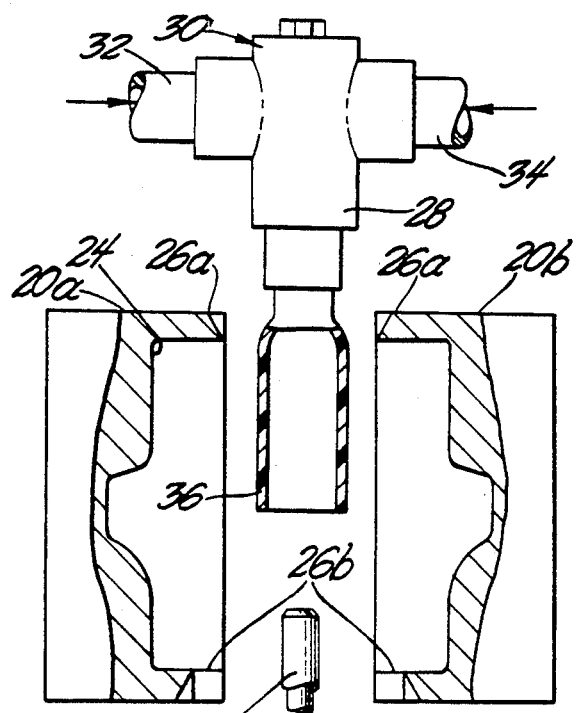
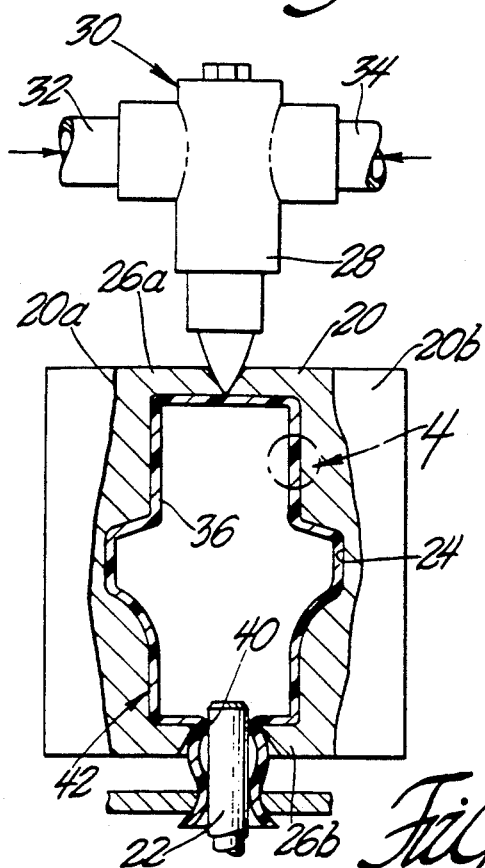
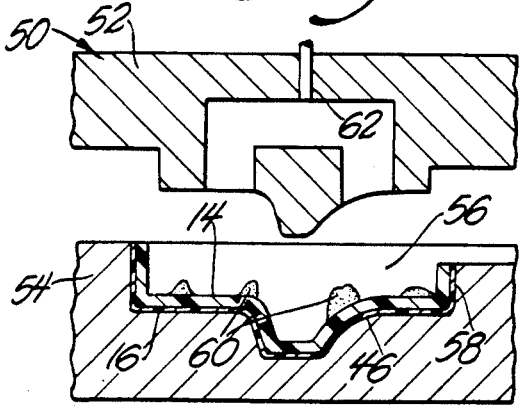
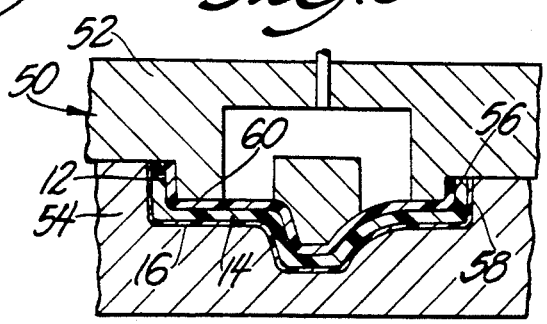

METHOD FOR MANUFACTURING AN AUTOMOBILE TRIM COMPONENT BY BLOW MOLDING AND INJECTION MOLDING

TECHNICAL FIELD

The invention relates to manufacturing a trim component comprising a shell with an outer skin layer, intermediate foam layer, and rigid core layer, and more particularly toward using a combination of blow molding and injection molding processes to manufacture the shell.

BACKGROUND OF THE INVENTION

Automotive interior trim components are utilized for door panels, instrument panels, etc. The trim components have been manufactured by layering a skin sheet adjacent a foam layer on a rigid core and laminating same to one another. U.S. Pat. No. 4,873,045 issued Oct. 10, 1989 in the name of Fujita et al. discloses a method of manufacturing an interior component which utilizes the steps of extruding a sheet of semi-molten thermoplastic resin material as a core directly onto the mold surface, positioning a skin layer having a cushioning layer on a mold with the cushion layer facing down, clamping the mold to bond the core and the skin layer together with the cushioning layer interposed therebetween. The problem with this type of method includes grain loss and limitation of designs.

Hollow bodies for unrelated applications have been produced from thermoplastic materials of a multi-layer construction as disclosed in U.S. Pat. No. 4,874,649 issued Oct. 17, 1989 in the name of Daubenbuchel et al. The patent discloses producing hollow bodies having a wall which has foamed thermoplastic material produced by an extrusion blow molding procedure. A preform is formed with a first layer and a second layer of foamable plastic material, and thereafter the preform is expanded in a blow molding process by the application of an internal pressure. The resultant form is of tubular configuration, and may be sealed closed at an end thereof.

SUMMARY OF THE INVENTION

The invention is a method of making an interior trim component for an automotive vehicle. The method includes the steps of: extrusion blow molding a preform of multilayer unfoamed and foamed materials forming a shaped article, sectioning the shaped article into at least two separate skins, placing at least one of the skins in a mold, and molding and adhering a rigid core layer to the skin with the foam material interposed between the core layer and the unfoamed material producing a structural shell.

In the preferred embodiment, the unfoamed and foamed materials are co-extruded adjacent one another simultaneously prior to blow molding. The subsequent blow molding forms the multilayers against a mold surface. Injection molding, with either thermoplastic or thermoset material, is used to mold the rigid core layer with the multilayer skin.

BRIEF DESCRIPTION OF THE DRAWINGS

The advantages of the invention will become more readily apparent when taken in conjunction with the accompanying drawings wherein:

FIG. 1 is a cut away view of an interior trim component made from the subject process;

FIG. 2 is a diagrammatic view of an extrusion and blow molding apparatus for the production of hollow shells for the trim component showing an extrusion step and a parison forming step;

FIG. 3 is a diagrammatic view of the mold of FIG. 2 in the closed position with the extruded foam and vinge skin blow molded against a parison die;

FIG. 4 is an enlarged fragmentary sectional view of a part of the wall of the extruded and blow molded skin;

FIG. 5 is a sectioned half of the blow molded skin removed from the mold;

FIG. 6 is a diagrammatic view of an injection mold in the open position with the skin placed therein and core resin injected thereon; and FIG. 7 is a diagrammatic view of the injection mold in the closed position molding the resin core with the skin forming the shell.

DESCRIPTION OF THE PREFERRED EMBODIMENT

An interior trim component for an automotive vehicle manufactured by the method of the subject invention is generally illustrated at 10 in FIG. 1. The trim component 10 includes a shell 18 of shaped, rigid resin core 12, a foam or cushion intermediate layer 14, and a decorative outer layer 16. The trim component 10 is generally utilized as an interior trim component of a vehicle such as interior door panels, instrument panels, etc. However, the invention is equally suited for use in other industries such as building, pumping, toys, furniture and luggage.

In the process of making a shell 18 for the interior trim component, the foam layer 14 and outer layer 16 are first made to a shaped skin by a combination extrusion and blow molding process. As illustrated in FIG. 2, a blow molding mold 20 is generally of two-part construction and of a predetermined shape complimenting the shape of the desired resultant trim component 10. The mold 20 provides a cavity 24 therein. A blow molding mandrel 22 is operatively disposed with respect to the mold 20 so as to project into the mold cavity 24 formed by the mold halves 20a, 20b. The mandrel 22 generally projects into the cavity 24 from below into a position between the two mold halves 20a, 20b. The two mold halves 20a, 20b are provided with flanges 26 for abutting one another when the mold 20 is closed. On an upper portion of the mold 20, the flanges 26a abut one another. On the lower portion of the mold 20, the flanges 26b abut adjacent and about the mandrel 22.

As illustrated in FIG. 2, an extrusion head 28 of an extrusion apparatus 30 is provided with at least two extruders 32, 34. However, it is to be understood that more than two may be utilized. When producing a preform 36 of tubular configuration, the extrusion head 28 has an annular outlet opening for directing coextruded thermoplastic or thermoset material outwardly as a hollow cylindrical shaped parison. Coextrusion means more than one material extruded simultaneously. While a cylindrically shaped preform 36 is shown, other shaped parisons suitable for blow molding, as commonly known in the art, are suited for use with the invention. Additionally, the term "foamed" material indicates a material including a blowing agent or similar component which will cause foaming. The term "unfoamed" is any type of material without a foaming component therein.

The wall of the preform 36 comprises first and second coextruded layers 14, 16. The outer layer comprises an unfoamed plastic material 16 which is passed into the extrusion head 28 from one of the two extruders 32 feeding same. The inner layer 14 comprises a foamed plastic material which is supplied to the extrusion head 28 from the other extruder 34. However, it is to be understood that more than two materials may be utilized in any combination of foamed and unfoamed versions. Due to the pressure relief effect after the material comes out of the extrusion head 28, the material forming the inner layer 14 begins to foam as it leaves the extrusion head 28. However, the timing is dependent on the extrusion temperature and decomposition temperature of the blowing agent in the foamed material. Thus, the foaming may also occur during or after blow molding or during or after the molding and adhering of the rigid core resin layer. Accordingly, by the termination of the extrusion operation producing the preform 36, the finished preform 36 comprises a foamed layer 14 and an unfoamed layer 16. The multi-layer, or foamed and unfoamed, plastic laminate structure of the wall of the preform can be clearly seen in FIG. 4.

When the preform 36 has reached its required length, the parison dies 20a, 20b of mold 20 are closed around same (FIG. 3). The excess material portions are squeezed off the preform 36, with the lower edges being squeezed off about the blowing mandrel 22. An opening 40 is thereby formed in the preform at the mandrel 22.

The blow molding step is preferably started just before the conclusion of closing the mold 20. Compressed air is supplied through the mandrel 22 causing the preform 36 to be expanded within the mold 20 and to bear against the wall defining the mold cavity 24 over the entire surface thereof, so that the preform 36 thus adopts the configuration defined by the mold cavity 24. The increased pressure produced within the preform 24 causes both the outer layer 16 and the inner layer 14 to be correspondingly displaced as the preform 36 adopts the configuration of the mold cavity 24. The inner layer 14 which, by virtue of being porous, is held and stabilized by the outer layer 16.

Once the foaming is completed and the plastic cured, the mold 20 is opened and separated to allow removal of the article 42. In order for the article 42 to be used as an interior trim component 10, the article 42 is sectioned to provide a plurality of shaped foamed and unfoamed laminated skins 46. In the preferred embodiment, the article 42 is cut in half in order to provide two multi-layer skins 46 of trim component configuration. The two halves of skin 46 may make up the right and left trim components of a vehicle door, armrest, handle, etc.

The skin 46 is composed of the continuous decorative outer layer 16 backed with a cushion layer 14. The skin 46 is not stretched as in common vacuum forming techniques and therefore retains its molded configuration and any grain impression formed therein by a grain effect pattern on the inner surface of the parison dies 20a, 20b.

Once the skin 46 is produced and cut into the desired size, the resin core 12 is molded therewith. An injection mold 50 having an upper 52 and lower 54 mold half forming a cavity 56 is illustrated in FIG. 6 in the open position. The cavity 56 includes interior surfaces 58 of a contour complimenting the shape of the blow mold 20 and the shaped skin 46.

The skin 46 is placed on the lower mold half 54 of the cavity 56 with the decorative layer 16 adjacent the mold 54 and the foam layer 14 facing upward. A core resin 60 is selectively injected into the cavity 56 using one or more gates 62 in the injection mold 50, as commonly known in the art. Either a thermoset material or thermoplastic material may be used as the core resin. The core resin 60 is placed on the skin in such a manner to ensure even flow and coverage when the mold is closed. The gates 62 used to inject the core resin could have variable orifices or controlled sequentially in order to profile the core material where it is required in the part, as commonly known in the art.

Once the core resin 60 is disposed on the skin 46, the mold 50 is closed and clamped, and the contents compressed to allow spreading of the resin core 60. However, it is to be understood that the core resin 60 could be disposed on the skin 46 before or after closure of the mold. Once the resin is cured to a rigid core layer 12, the mold 50 is opened and the shell 18 of the trim component 10 removed. The resultant shell is as the type illustrated in FIG. 1.

The decorative layer may comprise any type of thermoformable material, such as poly propylene. The foamable material comprises any type of thermoformable material such as polypropylene. The resin core may include materials such as polypropylene for the thermoplastic and polyurethane as the thermoset.

A fiberglass mat or preform could be placed on the cushion layer 14 of the skin 46 in the injection mold 50 prior to the introduction of the core resin 60. Once the core resin 60 is injected, it would penetrate the interstices of the glass mat. The purpose of the mat is utilized to increase dimensioned stability. The core material could be a solid resin, or foamed resin to reduce weight.

An advantage of the injection of the thermoplastic core material rather than extruding sheet material is control of the core resin temperature. By eliminating extrusion of the material, variations occurring in melt temperature across the length of the extruded material or from the accumulator, in the case of an accumulator type injection unit, are eliminated. In addition, the cycle time is decreased because there is no time required between movement of the extruder which is eliminated and reduced time to deliver the core resin.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method of making an interior trim component for an automotive vehicle, the method including the steps of:
    extruding a coextruded parison of multilayer unfoamed and foamable materials by extruding the unfoamed and foamable materials adjacent one another simultaneously and thereafter blow molding the coextruded parison to form a shaped article,
    sectioning the shaped article into at least two separate skins,
    molding and adhering a rigid core resin layer to at least one of said separate skins with foam material interposed between the core resin layer and the unfoamed material producing a structural shell, and wherein the molding step includes placing a skin in an injection mold and injection molding the rigid core resin layer to produce the shell.

2. A method as set forth in claim 1 further including foaming the foamable material after extruding and during blow molding.

3. A method as set forth in claim 1 further including foaming the foamable material after extruding and after blow molding.

4. A method as set forth in claim 2 further including injecting a molten thermoplastic resin onto the skin to form the rigid core resin layer.

5. A method as set forth in claim 2 further including injecting a thermoplastic resin onto the skin to form the rigid core resin layer.

6. A method as set forth in claim 1 further including foaming the foamable material after extruding, after blow molding, and during molding and adhering the rigid core resin layer.

7. A method as set forth in claim 1 further including foaming the foamable material after extruding, after blow molding, and after molding and adhering the rigid core resin layer.

* * * * *